United States Patent [19]

Aizawa

[11] Patent Number: 4,830,697
[45] Date of Patent: May 16, 1989

[54] METHOD AND APPARATUS FOR MANUFACTURING A MAGNETIC RECORDING DISK

[75] Inventor: Toshio Aizawa, Miyagi, Japan
[73] Assignee: Sony Corporation, Tokyo, Japan
[21] Appl. No.: 169,226
[22] Filed: Mar. 16, 1988
[30] Foreign Application Priority Data Mar. 20, 1987 [JP] Japan ................................. 62-066294

[51] Int. Cl.⁴ ............................................. B32B 31/00
[52] U.S. Cl. .................................... 156/163; 156/229;
156/494; 264/292; 425/383; 425/DIG. 53
[58] Field of Search ............... 156/160, 163, 391, 494,
156/581, 229; 360/135; 264/106, 107, 291, 292;
425/383, DIG. 48, DIG. 53; 428/65

[56] References Cited

U.S. PATENT DOCUMENTS

| | | | |
|---|---|---|---|
| 2,419,758 | 4/1947 | Borkland | 156/163 X |
| 3,761,333 | 9/1973 | Kleinbeck et al. | 360/135 X |
| 3,805,292 | 4/1974 | Hashiguchi et al. | 360/135 |
| 4,085,177 | 4/1978 | Sauer | 264/292 X |
| 4,394,342 | 7/1983 | Mercer | 425/DIG. 48 X |
| 4,631,609 | 12/1986 | Erickson et al. | 360/135 |
| 4,670,072 | 6/1987 | Pastor et al. | 156/163 X |
| 4,684,424 | 8/1987 | Augason | 156/163 |
| 4,729,805 | 3/1988 | Alexander et al. | 156/160 |

*Primary Examiner*—Michael W. Ball
*Assistant Examiner*—David W. Herb
*Attorney, Agent, or Firm*—Hill, Van Santen, Steadman & Simpson

[57] ABSTRACT

Method and apparatus for manufacturing a stretched surface recording disk wherein a laminate is formed by superposing magnetic sheets on upper and lower surfaces of a base with a bonding agent being interposed between the regions to be bonded, clamping both an outer annular portion and an inner annular portion of the resulting laminate, displacing the clamped inner annular portion including both magnetic sheets and the base relative to the clamped outer annular portion in a direction perpendicular to the surface of the base, thereby stretching the laminate and bonding the magnetic sheets to the base while the annular portions are so displaced.

7 Claims, 3 Drawing Sheets

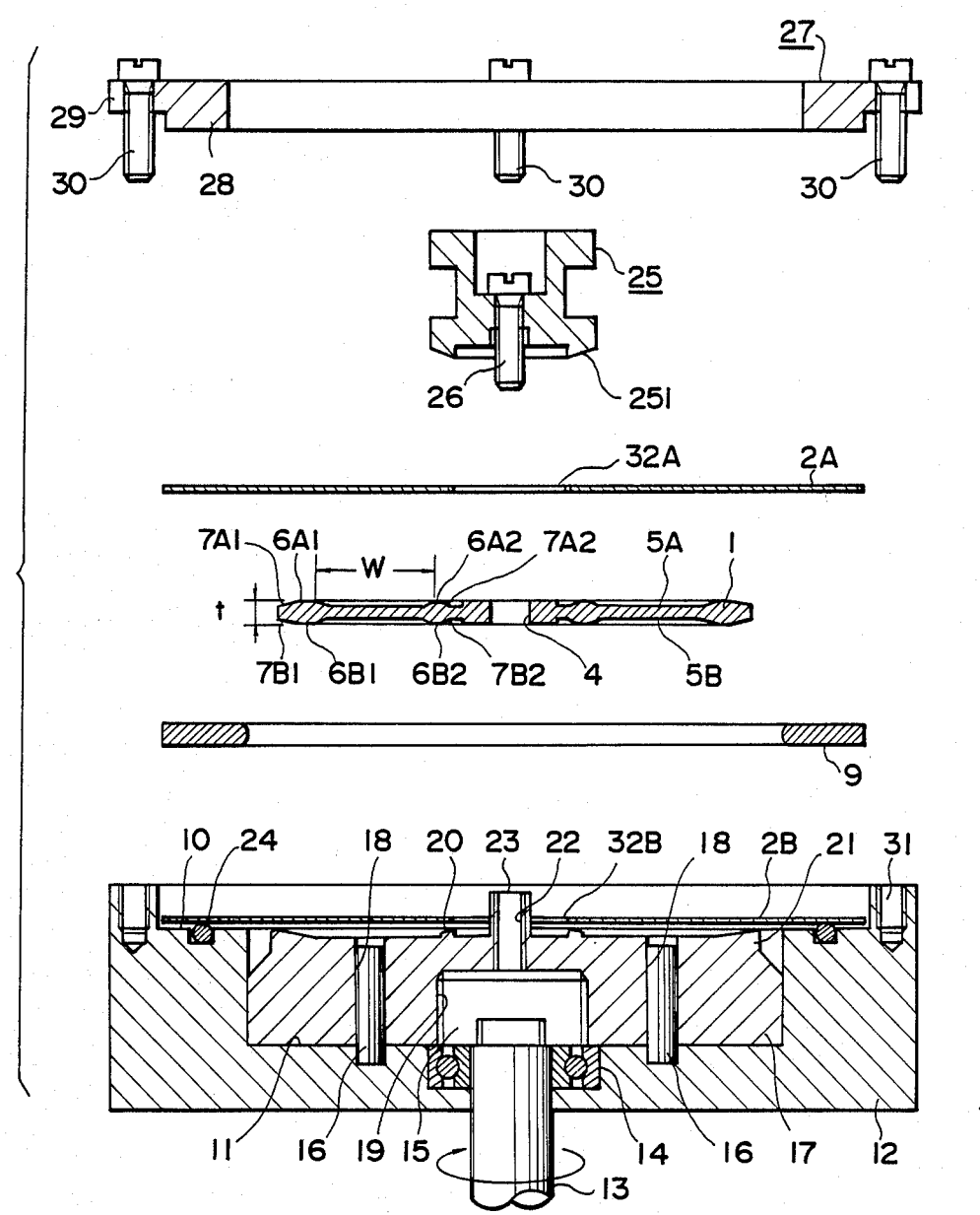

METHOD AND APPARATUS FOR MANUFACTURING A MAGNETIC RECORDING DISK

BACKGROUND OF THE INVENTION

1. Field of the Invention

The present invention is in the field of manufacturing magnetic recording disks from a laminate of magnetic sheets on a base and stretching the sheets prior to completing the bonding to the base.

2. Description of the Prior Art

The prior art has provided examples of tension type magnetic disks wherein magnetic sheets are joined under tension to upper and lower surfaces of a relatively rigid base in such a manner that a narrow gap is held between the magnetic recording region of each sheet and the base. Such magnetic disks and a method of producing the same are disclosed, for example, in European Patent Application No. 186427. The method described in this application, however, presents a variety of problems. For example, it is not adapted for continuous manufacture since the magnetic sheets on the two surfaces must be tensioned by temporary holders and only a small tension adjustment range is possible for the two magnetic sheets. Furthermore, an annealing step is necessary to release the stress caused in the magnetic sheets due to the tensioning operation, and the annealing step must be performed independently of the bonding step. Therefore, the disclosed process provides operational difficulties and problems with respect to product quality.

Other types of stretched surface recording disks and methods for their manufacture will be found, in general, in the following U.S. Pat. Nos.:
4,365,257
4,464,693
4,543,619
4,573,096
4,573,097
4,581,667
4,623,570
4,625,384
4,631,609
4,670,072

SUMMARY OF THE INVENTION

The present invention provides a method for manufacturing a magnetic recording disk in which stretched magnetic sheets are bonded to both sides of a disk shaped base simultaneously. The method is such that it lends itself to mass production techniques which provides improved productivity.

In the present invention, a magnetic disk is produced by first forming a laminate of a core or base and two magnetic sheets superposed on the upper and lower surfaces of the base with a bonding agent being interposed between predetermined regions of the sheets and the base. The outer annular portion and the inner annular portion of the laminate are clamped together and then the clamped inner portion of the laminate is displaced relatively to the clamped outer portion in a direction perpendicular to the surface of the base. This causes each of the two magnetic sheets to be tensioned with the required tension. While under tension, the bonding to the base occurs by subjecting the laminate to an elevated temperature, whereby the two magnetic sheets are joined to the base simultaneously with the required tension maintained. The bonding may be accompanied by an annealing of the sheets under tension so as to relieve some of the stress present, down to a predetermined value.

BRIEF DESCRIPTION OF THE DRAWINGS

FIG. 4 is an exploded view of the assembly shown in both FIGS. 1 and 2.

DESCRIPTION OF THE PREFERRED EMBODIMENTS

Figure 1:
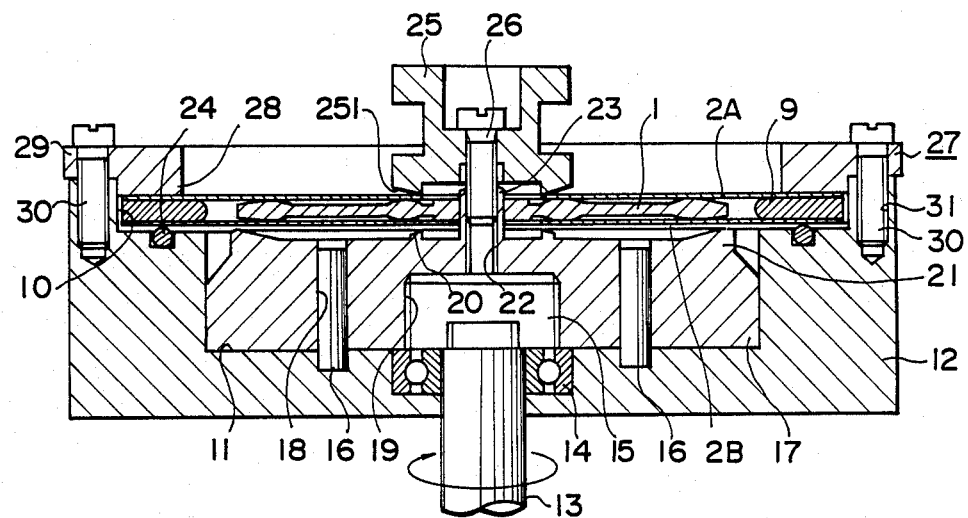
FIG. 1 is a cross-sectional view illustrating an initial stage in the formation of the improved magnetic disk of the present invention.
Figure 2:
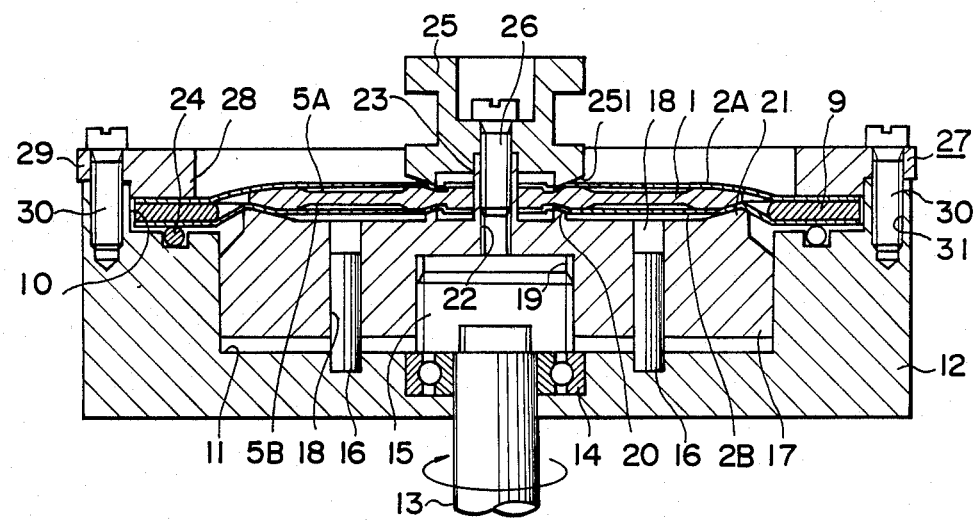
FIG. 2 is a view similar to FIG. 1 but showing the condition during the tensioning stage.

As shown in FIG. 1, the present invention involves forming a laminate by superposing magnetic sheets 2A and 2B on upper and lower surfaces of a relatively rigid base 1 while interposing a bonding agent between the regions which are to be mutually bonded. The method involves clamping an inner portion and an outer portion of the laminate and lifting the clamped inner portion of the laminate relative to the clamped outer portion in a direction perpendicular to the surface of the base 1 as shown in FIG. 2 while keeping the magnetic sheets 2A and 2B in contact with the outer portion of the base 1. Then, bonding is accomplished while the sheets are under tension due to the displacement between the outer and inner annular portions.

As shown in FIG. 1, the two magnetic sheets 2A and 2B are clamped annularly in the outer portions thereof beyond the periphery of the base 1. The inner portions of the two magnetic sheets 2A and 2B are supported annularly and pressed fixedly against the surfaces of the central portion of the base 1 in such a manner as to be movable relative to the clamped outer portion in a direction perpendicular to the surface of the base 1.

Figure 3:
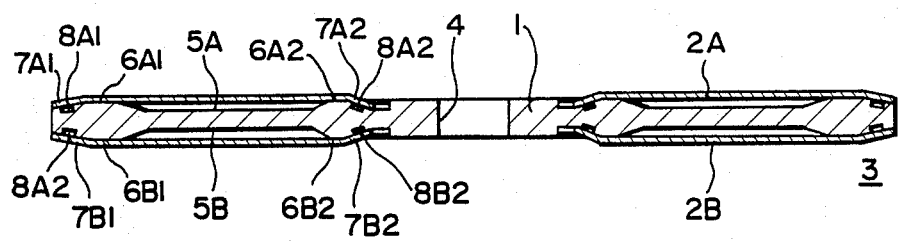
FIG. 3 is a cross-sectional view of the finished magnetic disk.

In the method of the present invention, the two magnetic sheets 2A and 2B are simultaneously stretched outwardly, i.e., radially and are kept taut with the required tension. By heating and hardening the bonding agent which is typically a thermosetting resin, or the like, interposed between the regions of the base 1 and the two magnetic sheets 2A and 2B to be bonded, there is produced, as illustrated in FIG. 3, a magnetic disk 3 wherein the magnetic sheets 2A and 2B are adhered to the opposed surfaces of the base 1. The tension on each of the magnetic sheets 2A and 2B can be adjusted over a wide range by controlling the amount of relative lifting of the clamped inner portion with respect to the clamped outer portion.

Turning to the apparatus, the base 1 is shown shaped into a circular disk with a center hole 4, and annular grooves 5A and 5B each having a predetermined width W formed in the upper and lower surfaces of the base 1 concentrically in at least the recording regions of the magnetic disk 3. Annular outer reference planes 6A1, 6B1 and annular inner reference planes 6A2, 6B2 perpendicular to the axis of the base 1 are formed at the outer edge and the inner edge of the annular grooves 5A and 5B. One flat surface is defined by the planes 6A1 an 6A2, and another flat surface is defined by the planes 6B1 and 6B2, respectively. Outer bevels 7A1 and 7B1 are formed in the peripheries of the outer reference planes 6A1 and 6B1 so that the base 1 becomes gradually thinner toward the circumference from the reference planes 6A1 and 6B1. Inner bevels 7A2 and 7B2 are formed inside the inner reference planes 6A2 and 6B2 closer to the central portion of the base 1 so that the base 1 becomes gradually thinner toward the center. If necessary, annular grooves 8A1, 8A2 and 8B1, 8B2 for receiving excess bonding agents may be formed in the bevels 7A1, 7A2 and 7B1, 7B2, respectively.

The base 1 may be composed of a metal plate of aluminum or an aluminum alloy, or the like, or may be molded out of thermosetting or thermoplastic resin. Typically, the base 1 can be produced by injection molding a polymer material with or without a filler mixed therein. The polymer material may be a resin such as a polysulfone, a polyphenylene, a polyester, or a polyetherimide. Non-magnetic inorganic particles of glass, glass beads, calcium carbonate, or the like may be included as a filler.

Each of the magnetic sheets 2A and 2B is composed of a non-magnetic plastic sheet of polyethylene terephthalate film or the like with a magnetic layer being formed thereon. The magnetic layer can be made by coating a magnetic paint composed of magnetic particles in a binder or a magnetic thin film of a ferromagnetic metal such as cobalt, nickel, iron, or alloys thereof can be deposited directly on the plastic sheet by sputtering, vacuum evaporation, ion plating or liquid phase plating.

The magnetic sheets 2A and 2B are so positioned that the non-magnetic plastic surfaces thereof are kept in contact with the outer and inner reference planes 6A1 and 6A2, 6B1 and 6B2, respectively, on the upper and lower surfaces of the base 1 and the inner and outer portions are bonded respectively to the bevels 7A1 and 7A2, 7B1 and 7B2.

The bonding agent is applied annularly on to the regions of the base 1 for bonding the magnetic sheets 2A and 2B thereto, i.e., on to the bevels 7A1 and 7A2, 7B1 and 7B2 and/or on to the regions of the magnetic sheets 2A and 2B corresponding to the bevels 7A1 and 7A2, 7B1 and 7B2. The glass transition temperature of the bonding agent should be substantially higher than room temperature, e.g., more than 120° C. It is desired that the bonding agent be of the thermosetting type such as an epoxy adhesive wherein an epoxy resin and a hardening agent are reacted upon heating. A typical hardening agent adapted for this use is, for example, dicyandiamide which evidences almost no reaction at room temperature or at customary preservation temperatures, but is rendered active ween heated up to 150° C. or so and reacts with the epoxy radical in the epoxy resin. One such epoxy bonding agent available is known as "XNR3505" which is a product of CibaGeigy Ltd.

The joining and a jig to be used therefore will be described below. As shown in the exploded view of FIG. 4, the jig includes a spacer ring 9 having an inner diameter greater than the outer diameter of the base 1 and having a thickness corresponding to the thickness t between the reference planes 7A1 and 7B1 of the base 1 and also between the reference planes 7A2 and 7B2.

The assembly includes an anchor table 12 having a circular shallow recess 10 with an inner diameter greater than the outer diameter of the spacer ring 9 and also a circular deep recess 11 formed at its center. In the recess 11, a shaft 13 is rotatably supported along the axis. The shaft support member 14 such as a ball bearing provides support for the shaft. At the inner end of the shaft 13 there is disposed a screw rod 15 which is held so as to be rotatable with the shaft 13 and has a screw thread about its peripheral surface. In the bottom portion of the recess 11, guide pins 16 are fixed upright about the axis of the recess 11.

In the recess 11 there is provided a shift member 17 which is movable vertically relative to the anchor table 12 along the axis of the recess 11. The shift member 17 has through holes 18 for the insertion of guide pins 16 and also has, in its central portion, a lead screw 19 engageable with the screw rod 15 so that when the screw rod 15 is rotated together with the shaft 13, the lead screw 19 is moved up or down along the screw rod to consequently cause a vertical motion of the shift member 17. On the top surface of the shift member 17 there is integrally formed an inner tilt ring 20 which has in its upper end face a slope formed corresponding to the inner bevel 7B2 on the lower surface of the base 1. In the outer portion there is integrally formed an outer tilt ring 21 which has, on its upper end face, a slope formed corresponding to the outer bevel 7B1 on the lower surface of the base 1. In the central portion of the shift member 17 there is formed a shaft 23 which has a center lead screw 22 which is insertable into the center hole 4 of the base 1.

If necessary, an O-ring 24 may be disposed in the outer bottom portion of the shallow recess 10. There is further provided an inner clamp member 25 for clamping the inner portions of the magnetic sheets 2A and 2B in cooperation with the shift member 17. The clamp member 25 is equipped on its lower end face with an inclined ring 251 which has a bevel corresponding to the inner bevel 7A2 of the base 1. The clamp 25 can be formed by a columnar body having along its central axis a clamping screw rod 26 engaged with the center lead screw 22 of the shaft 23 on the shift member 17.

An outer clamp member 27 is provided for clamping the outer portions of the magnetic sheets 2A and 2B jointly against the anchor table 12. The outer clamp member 27 is shaped in the form of a ring and has on its lower surface an annular projection 28 which is inserted into the shallow recess 10 of the anchor table 12. The clamp member 27 further has, at its periphery, a flange 29 butting against the top end face of the outer portion of the anchor table 12, the flange 29 being furnished with set screws 30 which are driven into screw holes 31 formed in the top end face of the outer portion of the anchor table 12.

With the structure described, a magnetic sheet 2B is placed in the shallow recess 10 of the anchor table 12 as illustrated in FIG. 1. The magnetic layer of the magnetic sheet 2B faces the anchor table. The sheet 2B is so formed as to have an outer shape greater in diameter than the base 1 and corresponding to the inner shape of the recess 10. It has, in its central portion, a center hole 32B which is smaller in diameter than the inner tilt ring 20 and extends through the shaft 23. The base 1 is set on the magnetic sheet 2B with a shaft 23 of the shift member 17 inserted into the center hole 4, and the spacer ring 9 is disposed around the base 1. Subsequently the second magnetic sheet 2A is placed in the hollow recess 10 of the anchor table 12 astride the base 1 and the spacer ring 9. The non-magnetic base side of the sheet 2A faces the base 1. The sheet 2A is so formed as to have an outer shape greater in diameter than the base 1 and corresponding to the inner shape of the recess 10. It has, in its central portion, a center hole 32A which is smaller in diameter than the tilt ring 251 of the inner clamp member 25 and extends through the shaft 23 of the shift member 17. Then the screw rod 26 of the inner clamp member 25 is engaged with the center lead screw 22 of the shaft 23, and the inner clamp member 25 is tightened to the state where the two magnetic sheets 2A, 2B and the base 1 are held between the two tilt rings 20 and 251. (In the showing of FIG. 1, the clamp member 25 is not tightened completely and therefore sufficiently firm clamping is not yet achieved).

When the outer clamp member 27 is tightened on the anchor table 12 by driving the set screws 30 into the screw holes 31, the outer portions of the two magnetic sheets 2A and 2B are clamped while being held between the bottom of the recess or the O-ring 24 and the projection 28 of the clamp member 27.

In this state, the shaft 13 is rotated to move the shift member 17 upwardly so that, as illustrated in FIG. 2, the clamped inner portion of the laminate of the two magnetic sheets 2A, 2B and the base 1 interposed therebetween is lifted relative to the clamped outer portion in a direction perpendicular to the surface of the base 1. Since the two magnetic sheets 2A and 2B are clamped at the inner and outer portions thereof, the two sheets are stretched radially and are thereby rendered taut with tension existing between the two clamped portions.

With the laminate of the base 1 and the two magnetic sheets 2A and 2B held in the anchor table by the inner clamp member 25 and the outer clamp member 27, the whole assembly is heated in a tunnel furnace or the like to a temperature range of 100° to 180° C. for a predetermined time such as a temperature of 150° C. for thirty minutes. The bonding agent is hardened to bond the magnetic sheets 2A and 2B to the bevel 7A1, 7A2, 7B1 and 7B2 of the base 1. At this stage, due to the existence of the grooves 8A1, 8A2, 8B1 and 8B2, any surface bonding agent is deposited into the grooves and is thereby prevented from flowing toward and into the annular grooves 5A and 5B in the base 1. In the same step as the heat treatment occurs for hardening the bonding agent, it becomes possible to perform an annealing for elimination of the stress caused in the magnetic sheets 2A and 2B as a result of the stretching.

The tension applied in joining the magnetic sheets 2A and 2B to the base can be adjusted by properly selecting the amount of lift of the clamped inner portion from the clamped outer portion in the above described jig and the thickness of the spacer ring 9. In order to finally obtain a desired tension after annealing the magnetic sheets 2A and 2B, the tension to be applied in the above step is so adjusted as to be two to three times the final tension.

When the magnetic sheets 2A and 2B are bonded to the upper and lower surfaces of the base 1, the peripheral regions of the magnetic sheets 2A and 2B projecting beyond the periphery of the base are severed and removed. Then, as illustrated in FIG. 3, the magnetic sheets 2A and 2B positioned between the upper reference planes 6A1 and 6A2 and between the lower reference planes 6B1 and 6B2 of the base 1 can be stretched while flat with a predetermined tension so that a gap corresponding to the depth of the grooves 5A and 5B is maintained over the width W between the base 1 and each of the magnetic sheets 2A and 2B on the annular grooves 5A and 5B, whereby a desired tension type magnetic disk 3 is obtained.

It is to be understood that the aforementioned jig can be modified into a variety of structures. As for the bonding agent, the epoxy adhesive is convenient for handling, but other adhesives are usable as well. The bonding agent is not limited to thermosetting materials alone and may be composed of a radiation curable type resin or other suitable material.

According to the present invention as described above, magnetic sheets 2A and 2B positioned on the two surfaces of a base 1 are clamped in both the inner and outer portions thereof, and the clamped portions are displaced relatively from each other so that the two magnetic sheets 2A and 2B are stretched simultaneously with the required tension. Thus, in comparison with the conventional process of stretching the magnetic sheets individually, the operation can be simplified considerably to bring about a substantial improvement. The jig used for performing the clamping and tensioning steps can be further utilized for hardening the bonding agent in a tunnel furnace and also for annealing the magnetic sheets 2A and 2B to reduce the stress caused in the stretching stage. Consequently, the process can be carried out as a continuous operation, leading to high mass productivity. The method also results in magnetic disks of remarkably uniform quality.

It will be evident that various modifications can be made to the described embodiments without departing from the scope of the present invention.

I claim as my invention:

1. A method of producing a magnetic disk comprising a base having a circular periphery interposed between two magnetic sheets, each sheet being bonded to the base along two annular concentric regions, said method comprising the steps of forming a lamina of the base sandwiched between two magnetic sheets by placing a magnetic sheet on an upper surface of the base and a second sheet on the lower surface of the base with a bonding agent being interposed between the sheets and base in the regions to be bonded; clamping an inner annular portion of each of the sheets onto a portion of the base and clamping an outer annular portion radially outward of said inner portion and outward of the periphery of said base, displacing the clamped inner portion including both the magnetic sheet and said base relative to the clamped outer annular portion in a direction perpendicular to the surface of said base so that the two sheets between the inner clamp portion and the periphery of the base are radially stretched; and then bonding said magnetic sheets to said base while said annular portion is displaced to bond the stretched sheets onto said base.

2. A method according to claim 1 wherein said bonding occurs at an elevated temperature.

3. A method according to claim 2 wherein said temperature is sufficient to anneal said magnetic sheets and partially relieves stresses formed therein.

4. A method according to claim 3 wherein the stretching of the magnetic sheets during displacing provides a tension substantially in excess of the desired tension, and annealing reduces the tension down to said desired tension.

5. A method according to claim 1, wherein the step of displacing the clamped inner portion includes moving the clamped inner portion vertically upward from the clamped outer portion and includes holding a portion of the second magnetic sheet on the bottom surface of the base adjacent the periphery of the base as the sheets and base are displaced upward.

6. An apparatus for manufacturing a stretched surface recording disk comprising a base sandwiched between two magnetic sheets which are secured at annular portions to said base, said apparatus comprising an anchor table having a central recess; a shift member positioned in said central recess of said anchor table; means engaging said shift member for vertically displacement of the member relative to said anchor table; means coacting with said shift member for clamping an inner annular portion of each of the magnetic sheets and the base to be laminated to said shift member to move therewith; means for clamping an outer annular portion of each of the magnetic sheets at a position outside of a circular periphery of the base so that when the shift member and the clamped inner portion are shifted relative to the means for clamping the outer portion, each of the sheets is stretched radially on said base.

7. An apparatus according to claim 6, wherein the shift member has an annular ridge for holding a magnetic sheet against the surface of the base adjacent the periphery thereof as the shift member is displaced relative to the means for clamping the outer annular portions of the magnetic sheets.

* * * * *